(12) United States Patent
Veenstra et al.

(10) Patent No.: US 7,036,981 B2
(45) Date of Patent: May 2, 2006

(54) DEVICE FOR MONITORING A MILK TANK AND AN ASSEMBLY OF SUCH A DEVICE WITH A MILKING ROBOT AND AN AUTOMATIC STARTING-UP UNIT

(75) Inventors: Aalze Veenstra, Gouda (NL); Renatus Ignatius Joséphus Fransen, Vlaardingen (NL)

(73) Assignee: Lely Enterprises AG, Zug (CH)

( * ) Notice: Subject to any disclaimer, the term of this patent is extended or adjusted under 35 U.S.C. 154(b) by 202 days.

(21) Appl. No.: 10/634,761

(22) Filed: Aug. 6, 2003

(65) Prior Publication Data

US 2004/0025606 A1 Feb. 12, 2004

(30) Foreign Application Priority Data

Aug. 6, 2002 (NL) .................................... 1021219
Sep. 11, 2002 (NL) .................................... 1021430

(51) Int. Cl.
*A01J 5/007* (2006.01)
*A01J 5/01* (2006.01)
*G01N 33/04* (2006.01)
*G01K 13/00* (2006.01)
*G01D 21/02* (2006.01)

(52) U.S. Cl. ..................... 374/142; 119/14.14; 134/133

(58) Field of Classification Search .. 119/14.14–14.17, 119/14.08; 374/142–143; 73/865.9, 866; 702/130; 134/133; 15/DIG. 11; 426/231
See application file for complete search history.

(56) References Cited

U.S. PATENT DOCUMENTS

| | | | | |
|---|---|---|---|---|
| 2,772,979 | A | * 12/1956 | Graves | 426/399 |
| 3,978,460 | A | * 8/1976 | Jaquith | 119/14.17 |
| 4,710,755 | A | 12/1987 | Gurney | 119/14.14 X |
| 6,006,615 | A | 12/1999 | Uttinger | 73/866 |
| 6,073,580 | A | * 6/2000 | Graupner et al. | 119/14.08 |
| 6,089,242 | A | 7/2000 | Buck | 134/57 R |
| 2004/0107913 | A1* | 6/2004 | Veenstra et al. | 119/14.51 |

FOREIGN PATENT DOCUMENTS

| | | | |
|---|---|---|---|
| EP | 0761091 A1 | 3/1997 | |
| GB | 2151801 A | * 7/1985 | 177/61 |
| WO | WO 01/19175 A1 | 3/2001 | |

\* cited by examiner

*Primary Examiner*—Thomas P. Noland
(74) *Attorney, Agent, or Firm*—Howrey LLP; David P. Owen; Jacobus C. Rasser

(57) ABSTRACT

A device for monitoring a milk tank. The device is provided with a monitoring unit comprising a computer and a memory for at least temporarily storing data, a thermometer for measuring the temperature of a fluid present in the milk tank, and for supplying to the monitoring unit a temperature signal that is indicative of the measured temperature, and with a meter for measuring an electrical parameter, such as the conductivity, of the fluid present in the milk tank and for supplying to the monitoring unit a parameter signal that is indicative of the measured electrical parameter.

38 Claims, 7 Drawing Sheets

DEVICE FOR MONITORING A MILK TANK AND AN ASSEMBLY OF SUCH A DEVICE WITH A MILKING ROBOT AND AN AUTOMATIC STARTING-UP UNIT

CROSS REFERENCE TO RELATED APPLICATIONS

This application claims priority from Dutch patent applications no. 1021219 filed 6 Aug. 2002 and no. 1021430 filed 11 Sep. 2002, the contents of which are hereby incorporated by reference in their entirety.

BACKGROUND OF INVENTION

1. Field of the Invention

The invention relates to the field of dairy appliances and more particularly to a device for monitoring a milk tank.

2. Description of the Related Art

Devices are known for monitoring the temperature within a milk tank. Such devices may comprise a thermometer within the milk tank. Other arrangements are known in which the temperature of milking entering a milk tank is measured. U.S. Pat. No. 6,006,615 to Uttinger and U.S. Pat. No. 4,710,755 to Gurney are examples of such devices.

SUMMARY OF INVENTION

According to the present invention, a device for monitoring a milk tank is provided, the device comprising a monitoring unit comprising a computer and a memory for at least temporarily storing data, a first meter for measuring the temperature of a fluid present in the milk tank and for supplying to the monitoring unit a temperature signal indicative of the measured temperature, and a second meter for measuring an electrical parameter of the fluid present in the milk tank and for supplying to the monitoring unit a parameter signal that is indicative of the measured electrical parameter. It has been found that extremely reliable monitoring, for example of the cleaning, of a milk tank can be achieved if both the temperature and an electrical parameter, such as the conductivity, of the fluid present in the milk tank is measured.

In an embodiment of a device according to the invention the monitoring unit may be provided with an input device for inputting the number of stages that comprise a cleaning process of the milk tank. In view of the large number of different types of cleaning processes, the monitoring device can thus easily be adapted to the type of cleaning process.

The memory is preferably suitable for containing, for each cleaning stage, a lower threshold and/or an upper threshold for the temperature and/or the electrical parameter and/or the duration of a stage. In this manner not only the entire cleaning process, but also each stage thereof can be monitored precisely.

According to a preferred embodiment, by providing the monitoring unit with an input device for inputting into the computer details of the fluid present in the milk tank, in particular the starting up of the monitoring device can take place quickly as a result of which the monitoring device is quickly operational.

The monitoring unit is preferably provided with a comparing device for comparing the measured temperature and/or the measured electrical parameter and/or the measured time with the relevant threshold. In an alternative preferred embodiment the comparing device may itself be suitable for selecting the threshold with which the measured temperature and/or the measured electrical parameter and/or the measured duration are/is compared.

A monitoring device that is automated to a high degree is obtained if the comparing device is suitable for selecting a threshold on the basis of the measured electrical parameter, in particular the conductivity, being below a predetermined switch value for a predetermined minimum switch time. Improved reliability of auto-selecting thresholds is achieved if the comparing device is suitable for selecting a threshold on the basis of the measured electrical parameter and the measured temperature. Both data can also be used for determining the sort of fluid present in the milk tank.

If the milk tank is provided with a stirring element for stirring a liquid present in the milk tank, it is advantageous for the monitoring of for example the cleaning of the milk tank or to the cooling of milk in the milk tank that the device is provided with a sensor for measuring the functioning of the stirring element and for supplying to the monitoring unit a functioning-signal that is indicative of the functioning of the stirring element.

A further improvement of the monitoring of the cleaning of the milk tank is achieved if the milk tank is provided with a supply line for milk and cleaning fluid, in which supply line there is provided a valve, and if the device is provided with a valve position detector for detecting the valve position of the valve and for supplying to the monitoring unit a valve position signal that is indicative of the valve position of the valve. In a further embodiment of a device according to the invention there is provided a three-way valve in the supply line, to which three-way valve there is connected a discharge line to a sewer or the like, the valve being located between the three-way valve and the milk tank, and the device is further provided with a three-way valve position detector for detecting the valve position of the three-way valve and for supplying to the monitoring unit a three-way valve position signal that is indicative of the valve position of the three-way valve.

Moreover it is possible to monitor the milk line, for example a cleaning process thereof, in a device according to the invention if the device is provided with a further thermometer for measuring the temperature of a fluid present in the discharge line, and for supplying to the monitoring unit a further temperature signal indicative of the temperature of the fluid present in the discharge line. In this case it is advantageous if the memory is suitable for containing a lower threshold and/or an upper threshold for the temperature of a fluid in the discharge line.

A more accurate indication about the fluid, i.e. milk or cleaning fluid, present in the supply line can be obtained if the device is provided with a meter for measuring an optical parameter of milk or cleaning fluid present in the supply line. The optical parameter may be for example light reflection, light dispersion, light absorption, color and the like. By making use of such an optical meter it is possible to prevent an undesired mixture of milk and cleaning fluid.

In an alternative embodiment of a device according to the invention an alarm device may be operated by the comparing device, whereby any deviation in for example the cleaning process or the cooling process can be signalled to a supervisor in a simple and quick manner.

The invention further relates to an assembly of a device according to the invention with a milking robot an automatic starting-up-unit and an alarm device, the alarm device being connected to the automatic starting-up-unit for preventing the automatic starting up of the milking robot with the aid of data from the comparing device. In this manner starting up of the milking robot can be prevented in the case that the cleaning process has not been performed correctly.

BRIEF DESCRIPTION OF DRAWINGS

Embodiments of the invention will now be explained in further detail by way of example only with reference to the accompanying figures, in which.

DETAILED DESCRIPTION

The invention will be described hereinafter with reference to the monitoring of a cleaning process of a milk tank. However, it will be obvious that the invention can also be applied for example to the monitoring of the cooling process of milk present in the milk tank, and to the monitoring of the pumping dry and/or the de-aeration of the milk tank. Thus it is possible for example to store temperature data in the memory of the computer when monitoring the cooling process, which data may be used for checking the cooling process. The invention is further described with reference to cleaning by means of a liquid, but it will be obvious that other fluids such as steam can also be used for the cleaning. The invention is also described with reference to the measuring of the conductivity, but it will be obvious that other electrical parameters, such as the pH, the capacitance and the like, can be used instead or as well.

Figure 1:
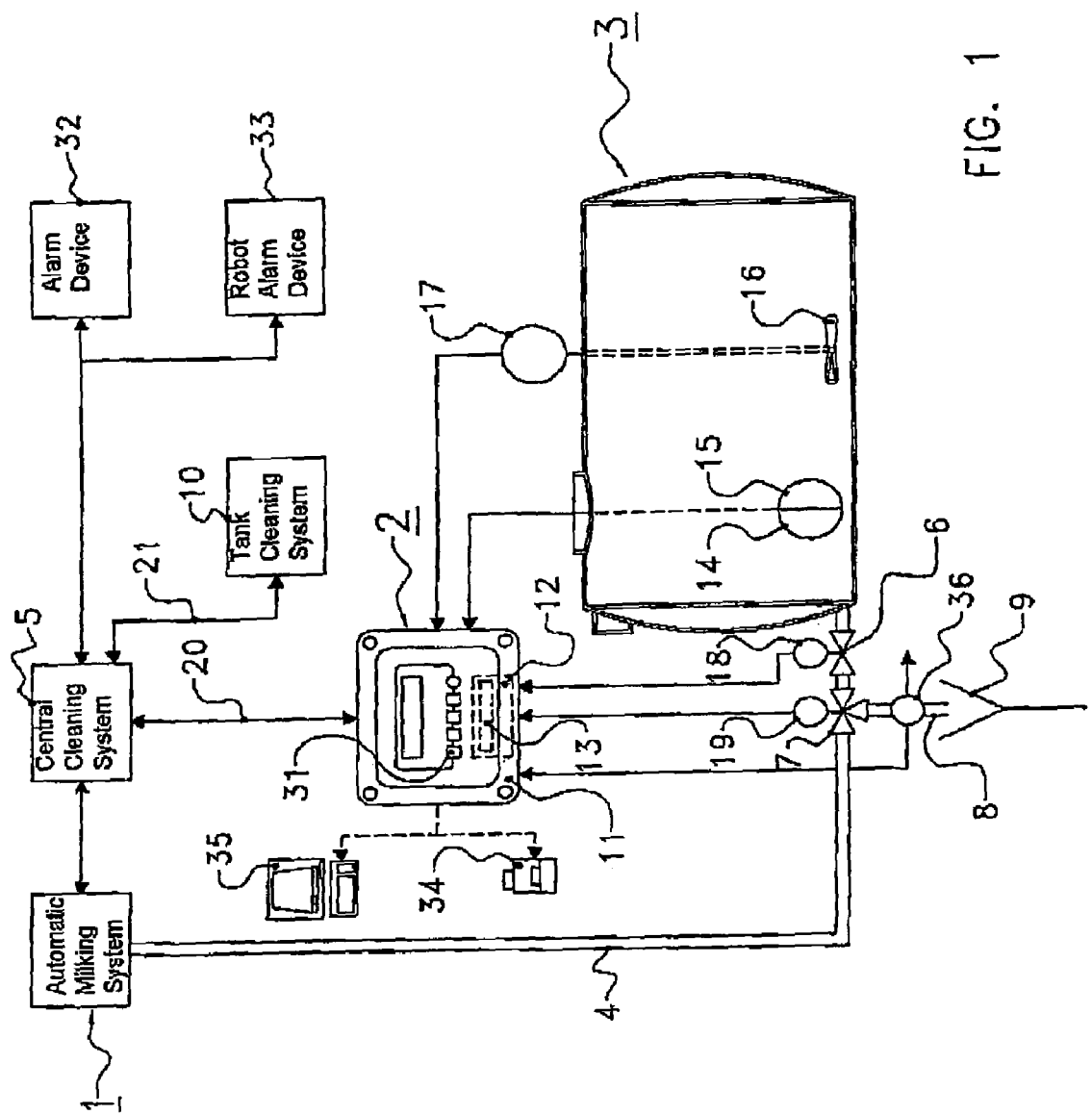
FIG. 1 shows diagrammatically a first embodiment of an assembly of an automatic milking system with an automatic starting-up-unit and a device according to the invention.

FIG. 1 shows diagrammatically a first embodiment of an assembly of an automatic milking system 1 with an automatic starting-up-unit and a device 2 for monitoring the cleaning of a milk tank 3 according to the invention. The automatic starting-up-unit ensures that after the cleaning of the milk tank has ended the automatic milking system 1 is started up automatically. Such an automatic starting-up-unit is known per se and will not be set out here in further detail for the sake of simplicity of the description.

The automatic milking system 1 is connected to the milk tank 3 via a supply line 4. Via the supply line it is possible to convey milk from the automatic milking system 1 to the milk tank 3 during the milking. A valve, in particular a controlled valve 6, is disposed in the supply line 4 for the purpose of allowing milk or other liquids, if desired, to flow into the milk tank 3.

It is known per se that the automatic milking system 1, in particular those components thereof that come directly into contact with milk, must be regularly cleaned. For this purpose there may be provided for example a central cleaning system 5, known per se. Cleaning liquids that have been passed from the central cleaning system 5 through the automatic milking system 1, are then discharged via the supply line 4. In the supply line 4 there is included a three-way valve, in particular a controlled three-way valve 7, to which is connected a discharge line 8 to a sewer 9 or the like. The valve 6 is located between the three-way valve 7 and the milk tank 3.

The milk present in the milk tank 3 is regularly removed, after which the milk tank 3 has to be cleaned. For this purpose there is provided a tank-cleaning system 10 known per se. Cleaning liquids for cleaning the milk tank 3 can be conveyed to the milk tank 3 via the automatic milking system 1 and the supply line 4. Alternatively the cleaning liquids may be conveyed directly from the tank-cleaning system 10 to the milk tank 3 via a direct (non-shown) tank-cleaning line.

The invention relates in particular to the device 2 for monitoring the cleaning of the milk tank 3. For this purpose the device 2 comprises a monitoring unit 11. The monitoring unit 11 comprises a computer 12 and a memory 13 for storing data at least temporarily.

The monitoring unit 11 is further provided with a thermometer 14 for measuring the temperature of a liquid (such as milk or cleaning liquid) present in the milk tank 3. The thermometer 14 can be connected to the monitoring unit 11, in particular the computer 12 thereof, for supplying to the monitoring unit 11 a temperature signal that is indicative of the measured temperature.

The monitoring unit 11 moreover comprises a conductivity meter 15 for measuring the conductivity of the liquid (such as milk or cleaning liquid) present in the milk tank 3. The conductivity meter 15 can be connected to the monitoring unit 11, in particular the computer 12 thereof, for supplying to the monitoring unit 11 a conductivity signal that is indicative of the measured conductivity.

If the milk tank 3 is provided with a stirring element for stirring the liquid (in particular a cleaning liquid for enhancing the cleaning function) that is present in the milk tank 3, the device 2 for monitoring the cleaning, in particular the monitoring unit 11, is preferably provided with a functioning sensor 17 for measuring the functioning of the stirring element 16, for example by measuring the number of revolutions thereof or the power supplied thereto. Said functioning sensor 17 can be connected to the monitoring unit 11, in particular the computer 12 thereof, for supplying to the monitoring unit a functioning-signal that is indicative of the functioning of the stirring element 16.

For accurate cleaning it is also of importance to know whether the valve 6 and/or the three-way valve 7 are/is in the correct position for the cleaning. For this purpose in the embodiment shown the monitoring unit 11 is also provided with a valve position detector 18 for detecting the valve position of the valve 6. The valve position detector 18 can be connected to the monitoring unit 11, in particular the computer 12 thereof, for supplying to the monitoring unit 11 a valve position signal that is indicative of the valve position of the valve 6. In the embodiment shown there is also provided a three-way valve position detector 19 for detecting the valve position of the three-way valve 7 and for supplying to the monitoring unit 11, in particular the computer 12 thereof, a three-way valve position signal that is indicative of the valve position of the three-way valve 7.

In the embodiment shown in FIG. 1 the automatic starting-up unit is constituted by the central cleaning system 5 that receives, via a first connection 21 of the tank-cleaning system 10, in particular through a manually operable button or the like, a signal for the end of the tank cleaning and as a result thereof automatically starts up again the automatic milking system. It will be obvious that in the embodiment shown in FIG. 1 the automatic milking system 1 has to be in its switched-off position during the tank cleaning. In the case that the monitoring unit 11 detects that one or more actions have not been performed correctly during the tank cleaning, the monitoring unit 11 can prevent the automatic starting up of the automatic milking system 1 via a connection, in particular a two-way connection 20.

Figure 2:
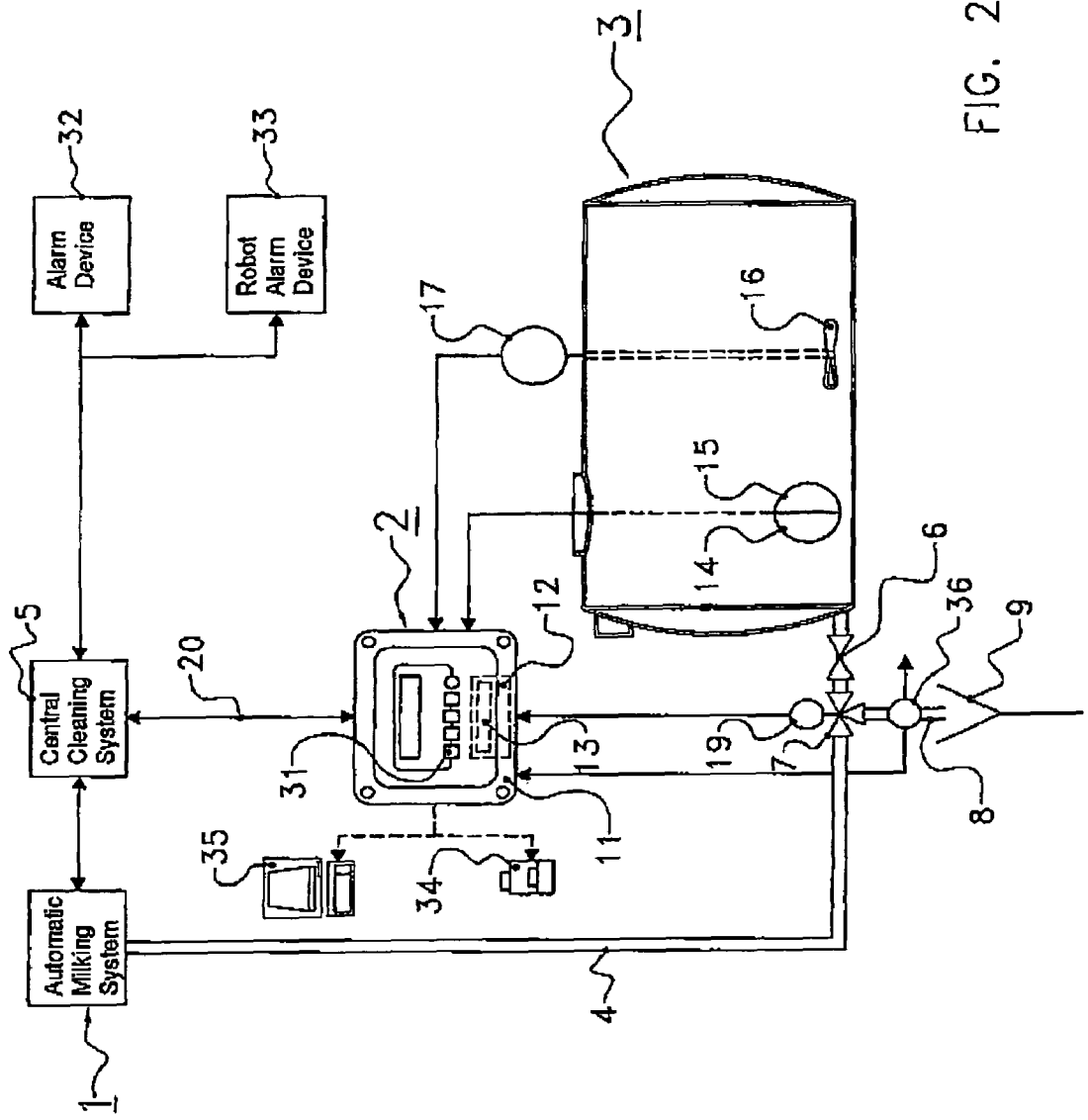
FIG. 2 shows diagrammatically a second embodiment of an assembly of an automatic milking system without an automatic starting-up-unit and a device according to the invention.

FIG. 2 shows diagrammatically a second embodiment of an assembly of an automatic milking system 1 and a device 2 for monitoring the cleaning of the milk tank 3. In FIG. 2 components corresponding to those of FIG. 1 are designated by the same reference numerals. In the embodiment of FIG. 2 there is no automatic starting up function, because there is no connection between a tank cleaning system (which is present, but not shown) and the central cleaning system 5. There is not provided a valve position detector 18 in this embodiment.

Figure 3:
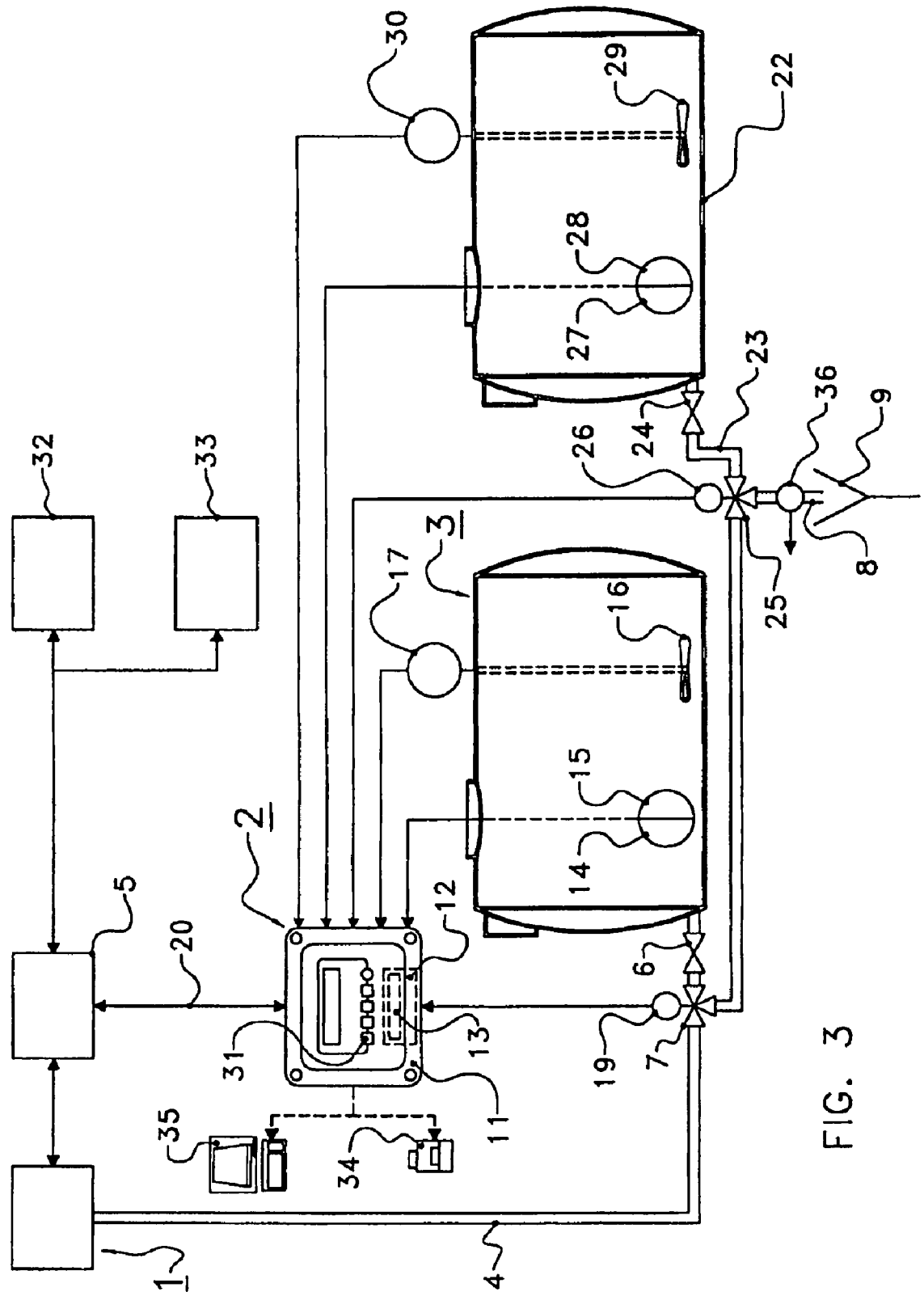
FIG. 3 shows diagrammatically a third embodiment of an assembly of a device according to the invention with an automatic milking system without an automatic starting-up-unit, comprising a milk tank and a buffer tank.

FIG. 3 shows diagrammatically a third embodiment of an assembly of an automatic milking system 1, and a device 2 for monitoring the cleaning of the milk tank 3 according to the invention, without an automatic starting-up unit. In the embodiment shown in FIG. 3 the assembly comprises, besides the milk tank 3, an additional milk tank that will be referred to hereinafter as buffer tank 22. In FIG. 3 components corresponding to those of FIG. 2 are designated by the same reference numerals. The differences between the embodiment of FIG. 2 and the embodiment of FIG. 3 will be enumerated hereinafter. In the embodiment of FIG. 3 the three-way valve 7 is not directly connected to the sewer 9, but connected to the sewer 9 or the like via a second three-way valve, in particular a controlled three-way valve 25. The second three-way valve 25 is connected to the buffer tank 22 via a second supply line 23 and a second valve, in particular a controlled valve 24. By correctly operating the valves it is then possible for example to convey the milk obtained from the automatic milking system 1 to the buffer tank 22 during the cleaning of the milk tank 3. In the embodiment shown there is also provided a second three-way valve position detector 26 for detecting the valve position of the second three-way valve 25 and for supplying to the monitoring unit 11, in particular the computer 12 thereof, a second three-way valve position signal that is indicative of the valve position of the second three-way valve 25.

The monitoring unit 11 further comprises a second thermometer 27 for measuring the temperature of a liquid (such as milk or cleaning liquid) present in the buffer tank 22. The second thermometer 27 can be connected to the monitoring unit 11, in particular the computer 12 thereof, for supplying to the monitoring unit 11 a temperature signal that is indicative of the measured temperature.

The monitoring unit 11 moreover comprises a second conductivity meter 28 for measuring the conductivity of the liquid (such as milk or cleaning liquid) present in the buffer tank 22. The second conductivity meter 28 can be connected to the monitoring unit 11, in particular the computer 12 thereof, for supplying to the monitoring unit 11 a conductivity signal that is indicative of the measured conductivity.

If the buffer tank 22 is provided with a second stirring element 29 for stirring the liquid (in particular a cleaning liquid for enhancing the cleaning function) present in the buffer tank 22, the device 2 for monitoring the cleaning, in particular the monitoring unit 11, is preferably provided with a second functioning sensor 30 for measuring the functioning of the second stirring element 29, for example by measuring the number of revolutions or the capacity thereof. Said second functioning sensor 30 can be connected to the monitoring unit 11, in particular the computer 12 thereof, for supplying to the monitoring unit 11 a functioning signal that is indicative of the functioning of the second stirring element 29.

In the embodiments shown in FIGS. 1, 2 and 3 the monitoring unit 11 further comprises a clock (not shown) for measuring time, integrated in the computer 12. In case of malfunction of the system said clock automatically continues to work with the aid of an emergency power supply whereby it can be assured that the points of time are stored in the memory.

The functioning of the device 2 for monitoring the cleaning of the milk tank 3 (and the buffer tank 22 if desired) will be explained with reference to the time graph of the temperature and the conductivity as measured in the milk tank 3, which time graph is diagrammatically shown in FIG. 4. In the embodiment shown in FIG. 4 the tank cleaning consists of three phases, i.e. a pre-rinsing phase A, a main cleaning phase B, and a post-rinsing phase C. In the embodiment shown the post-rinsing phase C comprises a first post-rinsing stage C1 and a second post-rinsing stage C2. The first post-rinsing stage C1 and the second post-rinsing stage C2 are separated by a post-rinsing time of rest period C3, in which period C3 there is no post-rinsing liquid present in the milk tank. The pre-rinsing phase A and the main cleaning phase B are also separated by a pre-rinsing time of rest period D during which no liquid is present in the milk tank. Furthermore, the main cleaning phase B and the post-rinsing phase C are separated by a main cleaning time of rest period E during which no liquid is present in the milk tank. Accordingly in the embodiment shown the total cleaning of the milk tank comprises four stages: pre-rinsing, main cleaning and twice post-rinsing.

It will be obvious that the invention is not limited to the number of stages of which the cleaning of the milk tank is composed, but that the invention can be applied to all types of cleanings.

Although the device 2 for monitoring the cleaning of the milk tank 3 may be programmed in such a way that said device is capable of distinguishing automatically the different stages of the cleaning as well as the presence of milk in the milk tank 3, as will be elucidated hereinafter, for a correct functioning of the monitoring device 2 the latter has preferably tested a cleaning cycle for continuity one or more times for obtaining reliable data.

The monitoring device 2 can be brought into action almost immediately if the monitoring unit 11 is provided with an input device 31, for example comprising push buttons, for inputting the number of stages that the cleaning of the milk tank 3 comprises, in particular also whether stages belong to the same phases. Of course, such data are known to the user of the tank cleaning system.

The same input device 31 (or alternatively another input device) may also be used for inputting the type of liquid present in the milk tank 3 at the moment when the thermometer 14 and the conductivity meter take measurements in the milk tank 3 for the first time. In this manner the monitoring device 2 can be initiated.

Figure 4:
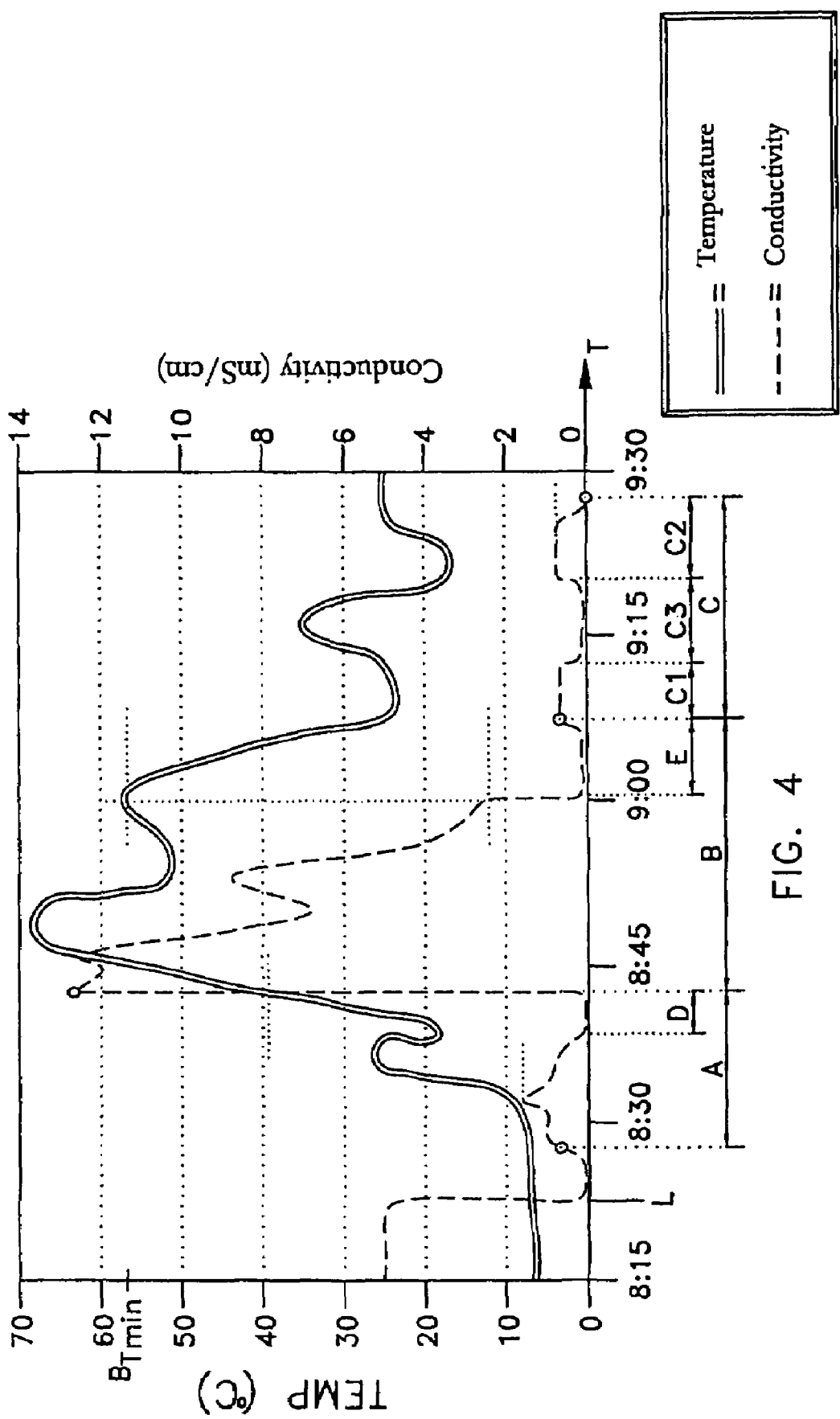
FIG. 4 shows diagrammatically a graph of the temperature and the conductivity plotted against time, as measured in the milk tank by means of a device according to the invention.

In the embodiment shown in FIG. 4 it is assumed that at the 0-point of time (i.e. 8:15) the measurements are performed for the first time. At that moment milk is present in the milk tank 3, which can be input into the computer by the input device 31. It is further input that the cleaning consists of the above-mentioned three phases, the last phase comprising two stages. For this purpose scroll menus known per se or other programs may be used.

It is also assumed that the milk tank 3 is provided with a cooling-unit, so that the measured temperature of the milk is approximately 7° C. and the measured conductivity approximately 5 mS/cm.

At the point of time L the milk tank 3 is emptied, which is visible in the diagram as a result of the fact that the conductivity decreases to approximately 0 mS/cm. The temperature hardly changes, as the air present in the milk tank 3 has a comparable temperature. Before the milk tank 3 is emptied, the automatic milking system 1 is put out of operation (in the embodiments of FIGS. 1 and 2) or the valves are brought into such a position that the milk obtained from the automatic milking system 1 is conveyed to the buffer tank 22.

After the milk tank 3 has been emptied the valves and the tank-cleaning system 10 are brought into such a position that pre-rinsing liquid is supplied to the milk tank 3. The temperature of said pre-rinsing liquid should not be too high in order to prevent milk residue still present in the milk tank 3 from caking onto the wall thereof. For a correct pre-rinsing of the milk tank it is further required that the pre-rinsing phase has a certain minimum duration. The pre-rinsing liquid is removed from the milk tank, after which the main cleaning can take place.

As is apparent from the diagram of FIG. 4, in the main cleaning a liquid is used with a higher temperature and a higher conductivity (as a result of cleaning promoting substances, such as acid solutions and the like, present in the liquid). It is usually assumed that the main cleaning has been performed correctly when the main cleaning has taken a certain minimum time and when at the end thereof a certain minimum temperature and a certain minimum conductivity have been attained. Said minimum temperature is indicated in the graph as $B_{Tmin}$.

After the main cleaning the post-rinsing takes place (in two stages) to ensure that the cleaning-promoting substances are removed from the milk tank. This is checked in particular by measuring the conductivity. If the post-rinsing has been performed correctly, the conductivity after the post-rinsing is approximately 0 mS/cm. The post-rinsing liquid is preferably not too hot.

In order to monitor the different stages of the cleaning of the milk tank 3 and to be able to conclude in this manner whether each of the stages has been performed correctly, the memory 13 of the computer 12 of the monitoring unit 11 is suitable for containing per stage a lower threshold and/or an upper threshold for the temperature and/or the conductivity and/or the duration of a stage. Said thresholds may be input for example via the input device 31.

For the pre-rinsing for example an upper threshold for the temperature of approximately 30° C., a minimum duration of approximately 400 s, and a maximum conductivity of 1.2 mS/cm may be input into the memory. For the main cleaning for example the minimum temperature ($B_{Tmin}$) of 60° C., a minimum duration of 120 s and a minimum conductivity at the end of the main cleaning of 2.0 mS/cm may be input into the memory. Analogously for the post-rinsing for each of the stages a minimum duration of 180 s, a maximum temperature of 35° C. and a maximum conductivity after the last rinsing stage of 0.5 mS/cm may be input into the memory.

The monitoring unit 11 is provided with a comparing device (in the embodiments shown integrated in the computer 12, although alternatively a separate comparing device may be used) for comparing the measured temperature and/or the measured conductivity and/or the measured time with the relevant threshold. When the comparing device detects a deviation, the comparing device supplies an alarm signal to an alarm device 32, as a result of which the alarm device 32 can be operated. The alarm device may be a separate alarm device 32 or, in the case of an automatic milking system 1, the robot alarm device 33. The alarm device is then capable of giving for example a message to the mobile telephone of the supervisor, or a similar message. Furthermore, in the case of FIG. 1, the alarm signal can be supplied to the central cleaning system 5 via the line 20 in order that the automatic starting up of the automatic milking system 1 is prevented. Additionally or alternatively the alarm signals can also control a printer 34 or a computer 35 e.g. at the location of the supervisor in such a way that the messages of alarm situations are printed or displayed and/or stored.

Alarm signals may be supplied for example when during the pre-rinsing the temperature has come above the upper threshold, the duration of the pre-rinsing stage has remained below the minimum threshold or the conductivity has come above-the maximum threshold.

The device 2 for monitoring the cleaning of the milk tank 3 can be programmed in such a way that it is capable of distinguishing automatically the different stages of the cleaning as well as the presence of milk in the milk tank 3. For this purpose the comparing device is suitable for selecting itself the threshold with which the measured temperature and/or the measured conductivity and/or the measured time is compared. It will be obvious that per stage other thresholds apply and that, when the measured values in one stage are compared with the thresholds belonging to another stage, this gives cause for incorrect alarm signals. The comparing device is in particular suitable for selecting a new threshold when during a predetermined minimum switch time the measured conductivity (also called conduction) has been below a predetermined switch conductivity. With reference to the graph shown in FIG. 4 it is then obvious that, each time when the milk tank is empty, the conductivity is approximately 0 mS/cm, and that the comparing device uses this conductivity to determine that another stage begins for which other thresholds have to be used.

Although in most cases it is sufficiently accurate if only the conductivity is used by the comparing device for switching to other thresholds, in some cases it may be necessary also to use the measured temperature in this situation. As is apparent from the graph of FIG. 4 each liquid has an individual conductivity and associated temperature. By using these measured values it is possible for the comparing device to distinguish whether milk, pre-rinsing liquid, main cleaning liquid or post-rinsing liquid is present in the milk tank. It is thus possible for the device 2 for monitoring the cleaning of the milk tank to be what is called self-acting and to determine independently which liquid is present in the milk tank at a certain moment and whether the conductivity and temperature for that liquid are within the predetermined thresholds.

Figure 5:
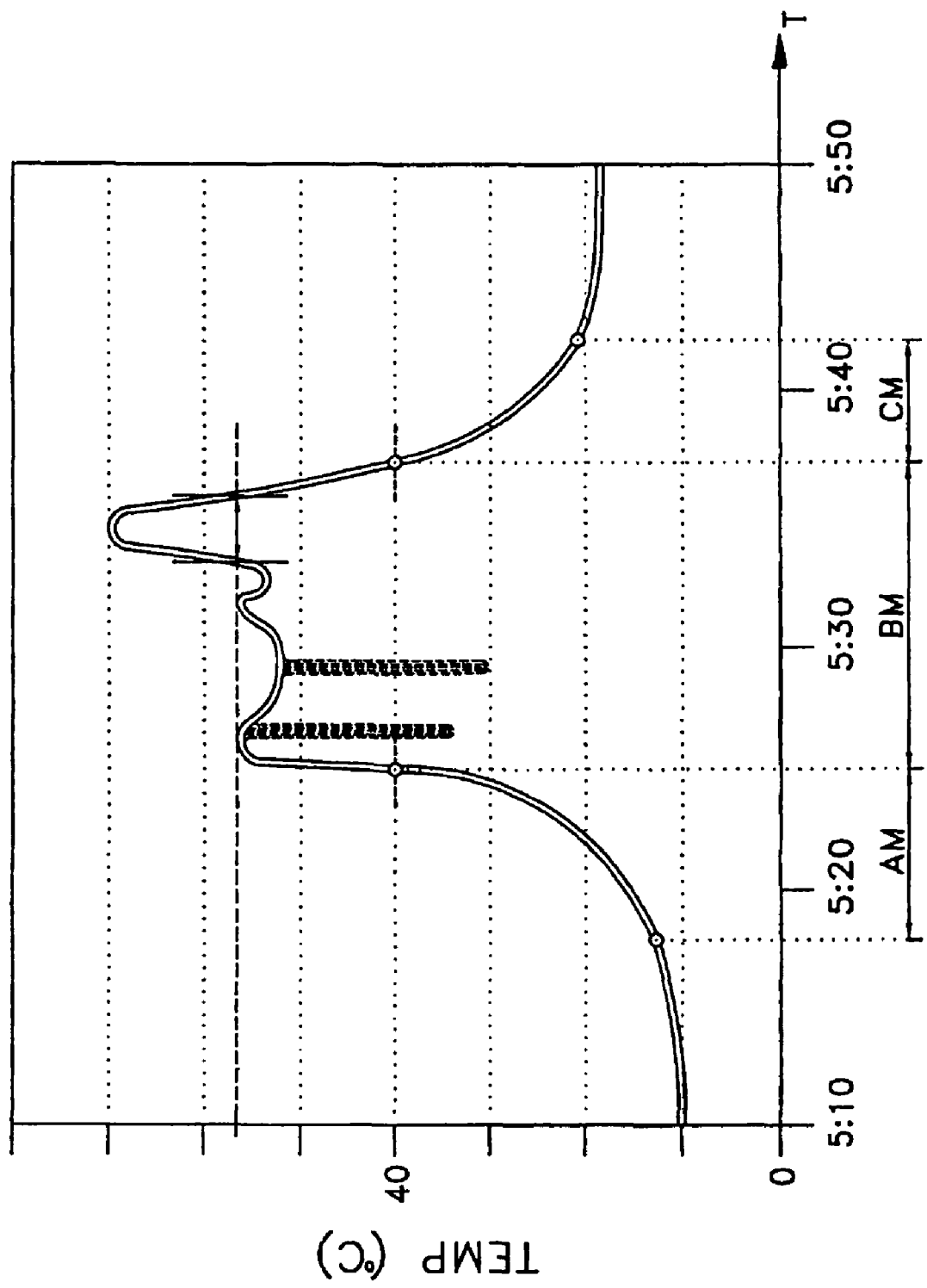
FIG. 5 shows diagrammatically a graph of the temperature plotted against time, as measured in the discharge line to the sewer.

In the embodiments shown the monitoring device 2 is provided with a further thermometer 36 for measuring the temperature of a liquid present in the discharge line 8. The further thermometer 36 is suitable for supplying to the monitoring unit 11 a further temperature signal that is indicative of the temperature of the liquid present in the discharge line. The measured values of this further thermometer 36 can then be used to monitor the cleaning of the milk line. Such a cleaning is shown diagrammatically in the graph of FIG. 5 and described in detail in co-pending U.S. application Ser. No. 10/604,619, filed 5$^{th}$ Aug. 2003 and entitled "A DEVICE FOR AND A METHOD OF MONITORING THE CLEANING OF A MILK LINE", now abandoned, the contents of which are hereby incorporated by reference in their entirety. In this cleaning a pre-rinsing phase AM, a main cleaning phase BM and a post-rinsing phase CM can be distinguished. It is usually assumed that the cleaning of the milk line has been performed correctly when the temperature has constantly been above approximately 40° C. during the main cleaning phase BM, which can simply be detected by the device according to the invention. It has been found, however, that due to the fact that during the cleaning of the milk line the cleaning liquid, in particular the cleaning liquid that has been used during the main cleaning phase, is pulsated, the temperature comes below the temperature threshold during the main cleaning phase BM (and then again rises to above said temperature threshold). This not only leads to many incorrect alarms, but moreover makes it impossible to take a correct decision as to whether or not the cleaning of the milk line has been performed properly.

In the monitoring device 2 according to the invention, incorrect messages are prevented by recording in the memory 13 of the computer 12 the first moment when the temperature has come above the threshold (for example 40° C.) and the last moment when the temperature has dropped below the threshold. The last moment may be determined for example by measuring, within a measuring time period after a moment when the temperature has come below the threshold, whether the temperature rises again to above the threshold. The measuring-time duration may be determined while taking into account the duration of the pulsations, and may have for example a value of twice (or a different multiple) the pulsation duration. The measuring time period may alternatively be a fixed time period in which measurements take place. After it has been established that within the measuring time period the temperature has not returned to above the temperature threshold, it is established that the main cleaning phase BM has ended. Only at that moment the comparing device compares whether the temperature has met the predetermined thresholds during the main cleaning phase BM. Thus many incorrect messages are prevented. According to the invention a correct main cleaning has taken place if during the main cleaning phase the temperature of the main cleaning liquid has attained at least a minimum temperature value (for example 57° C.) during an uninterrupted time (for example 120 s). Of course, other thresholds may be applied as well.

The memory 13 is then suitable for containing a lower threshold for the temperature of a liquid in the discharge line for the main cleaning phase. Furthermore, analogous to the pre-rinsing phase of the milk tank, an upper threshold for the temperature in the main cleaning phase may be included in the memory. Other thresholds may be applied as well. Also in this case the comparing device is capable of supplying an alarm signal to the alarm device, as a result of which the alarm device can be operated.

Although the invention is described with reference to an assembly comprising an automatic milking system, it will be obvious that the invention can also be applied to an assembly comprising a conventional or semi-automatic milking system. It will further be obvious that the monitoring of the cleaning of the milk line can also be performed by a separate monitoring device that is separate from the monitoring device 2. The further thermometer may also be disposed in the milk line (supply line).

In the supply line there may also be provided a light reflection meter known per se (or a meter that measures other optical parameters) for measuring the light reflection of the fluid present in the supply line. By means of such a meter it is possible to obtain an accurate indication of whether there is milk or cleaning fluid present in the supply line, because milk has different optical properties to those of cleaning fluid. By comparing the measured light reflection with reference values it is thus possible to determine whether milk or cleaning fluid is present in the supply line and accordingly to control the valves and/or cocks in such a way that an undesired mixture of milk and cleaning fluid is prevented.

Although for the thermometer and the conductivity meter many meters known per se may be used, a preferred embodiment of fastening such meters in the milk tank will be described hereinafter with reference to FIGS. 6 and 7, it being obvious that the invention is not limited to this embodiment.

Figure 6:
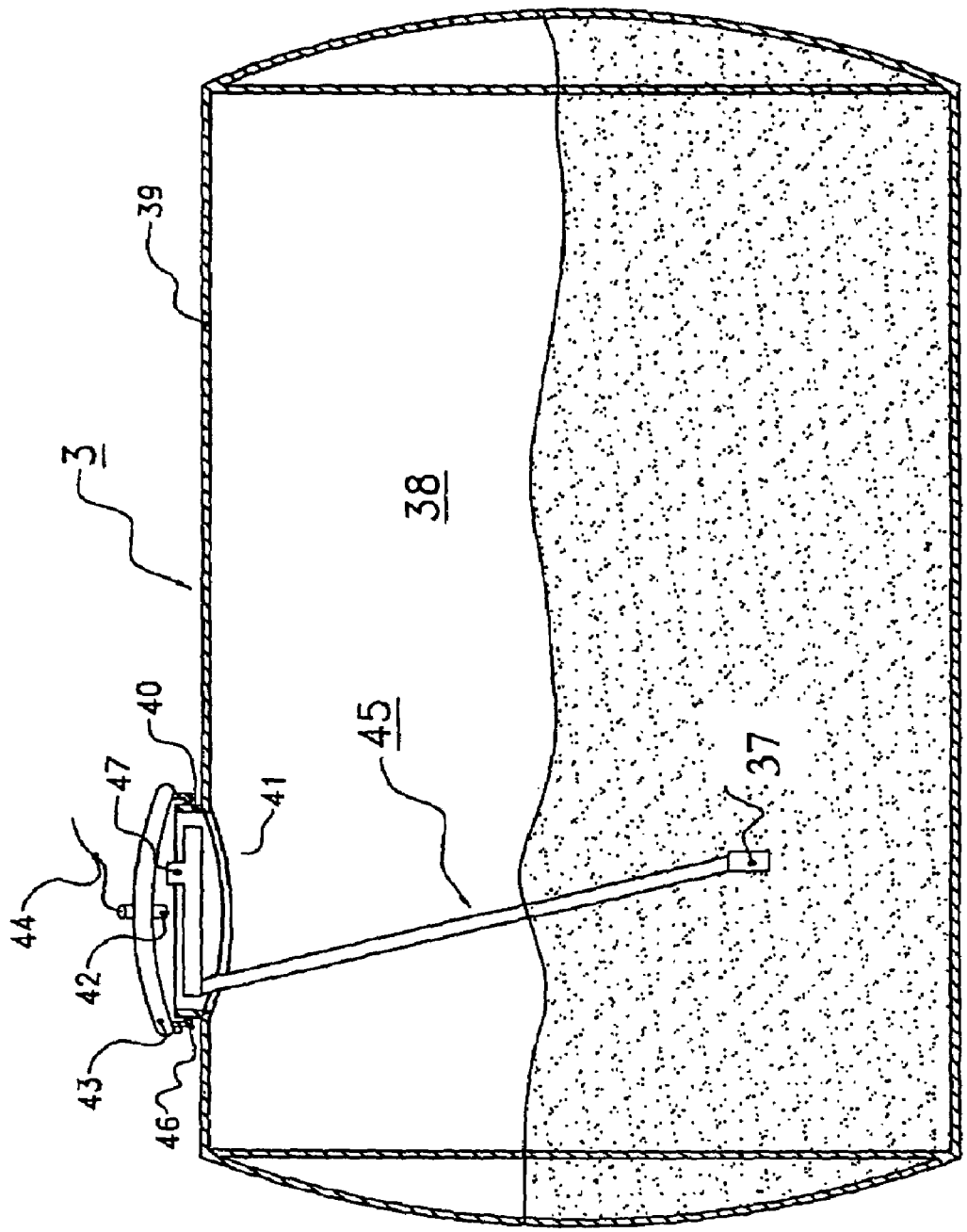
FIG. 6 shows diagrammatically in side view a measuring probe of a device according to the invention, which measuring probe is fastened in a milk tank.
Figure 7:
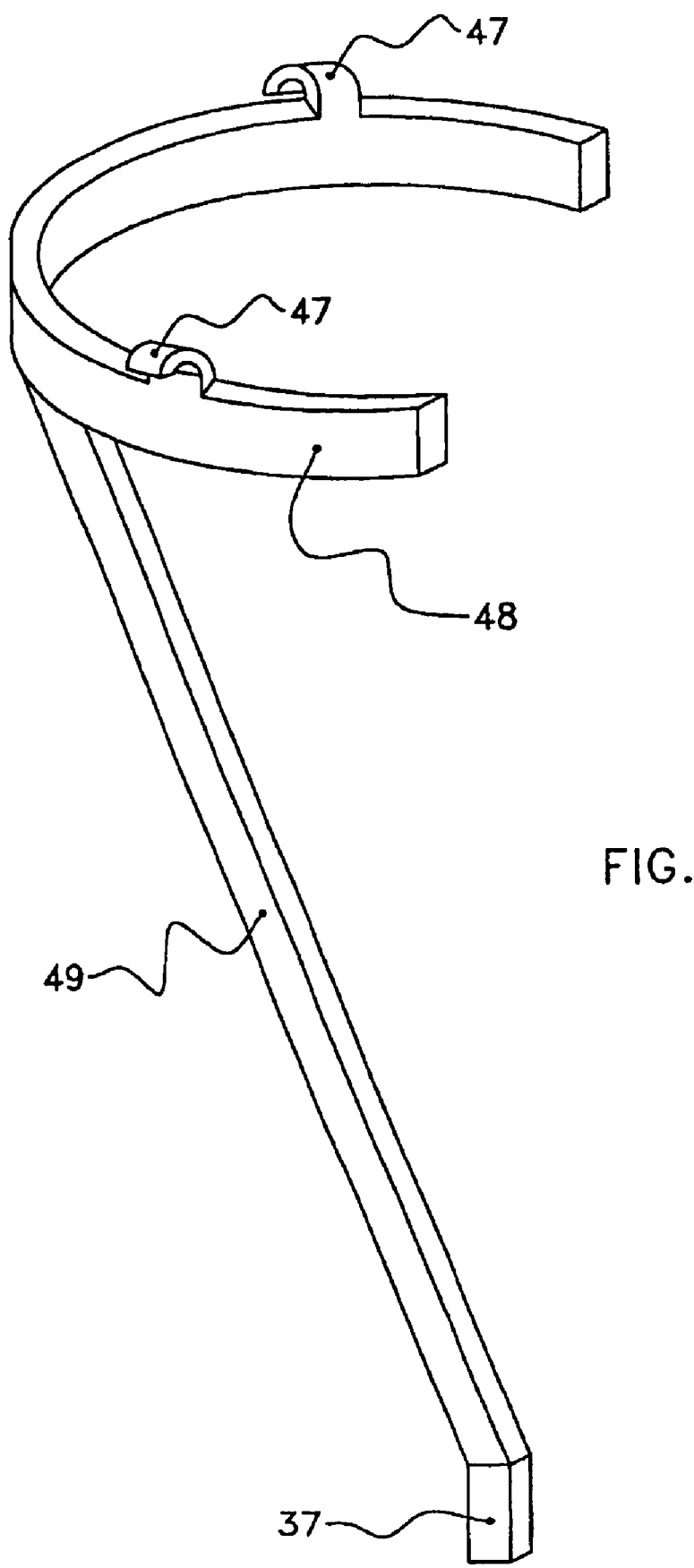
FIG. 7 shows diagrammatically a fastening element for the measuring probe in FIG. 6, which fastening element comprises a C-shaped profile section.

FIG. 6 shows diagrammatically a side view of an assembly of a milk tank 3 and a measuring probe 37, in which a thermometer and a conductivity meter are integrated. The milk tank 3 is provided with a space 38 for containing milk. In the case that the milk tank 3 is cleaned, the space 38 can contain cleaning liquid. The milk tank 3 further has a wall 39. The wall 39 is provided with an aperture portion for a customary aperture in the wall 39, in the embodiment shown a manhole portion 40 defining a manhole 41. The measuring probe 37 is located at least partially in the space 38 of the milk tank 3, preferably at a small distance from the lower side of the milk tank 3.

The measuring probe may be disposed for example on a float that is capable of floating on a liquid present in the milk tank. Such a measuring probe is capable of transmitting the data obtained preferably in a wireless manner, for example to a receiver 42 disposed on the inner side of a cover 43 that closes the manhole 41. The receiver is connected for example via a cable 44 to the computer 12 for processing the data. Data transmission may also take place in an inductive manner through the wall 39. In particular if the measuring probe is a contactless measuring probe, i.e. a measuring probe that obtains measured values without physical contact with the liquid, the measuring probe may also be disposed on the inner side of the cover. Data may be obtained for example in an optical manner (image processing, color recognition), ultrasonically, via sound reflections, via infrared or the like.

In the embodiment as shown in FIG. 6 the assembly comprises a fastening element 45 for fastening the measuring probe 37 to at least a part of the manhole portion 40. The manhole portion 40 comprises a rim 46, which rim 46 extends in a direction away from the space 38. The fastening element 45, in the embodiment shown (see FIG. 7) comprising a C-shaped profile section of flexible material, can be disposed between the cover 43 and the rim 46 of the manhole 41 and is thus kept in between by clamping. The C-shaped profile section is provided with hooks 47 intended for engaging the rim 46.

Because of the C-shaped profile section, and due to the fact that the profile section is preferably made of flexible material, the fastening element 45 is suitable for being used with manholes having different diameters. Other profile sections or constructions of fastening means having a size that can be adapted to the diameter of the manhole are possible as well. In this case there may be used for example rings that can telescopically slide into and out of each other.

As flexible material in particular stainless steel is suitable, although synthetic material is suitable as well because of its slight sensitivity to ageing.

Although the fastening element may be a one-part fastening element, a two-part fastening element is possible as well. A first fastening element 48 (for example the C-shaped profile section) can then be attached to the manhole portion and a second fastening element 49 (for example a bar) can then be attached to the measuring probe 37, as shown in FIG. 7.

Alternatively or additionally the fastening element may be attached to the cover.

The measuring probe may comprise additional measuring sensors for measuring the cleanliness of the interior of the milk tank, measuring the amount of liquid present in the milk tank and/or the chemical composition (in particular the penicillin-content) of the liquid present in the milk tank. This can take place in a contactless manner or by contact with the liquid. For this purpose is used in particular a color meter for measuring the color and/or the intensity of a color band of the fluid present in the milk tank. The measured values can be compared with reference values, and on the basis of the comparison result actions can be taken if desired. On the basis of the measured values different decisions can be taken, or certain checks can be performed. The measuring probe may also comprise a sound meter for detecting sloshing of liquid, which may be an indication of the functioning of the stirring element. Different sensors for detecting the functioning of the stirring element are possible as well, a resistance meter, torque meter or capacity meter, disposed near the stirring element, being suitable in particular in this situation.

It will be obvious that the invention is not limited to the embodiments shown in the figures. The three-way valves may be replaced for example by equivalent means comprising cocks and/or valves.

Many further modifications in addition to those described above may be made to the structures and techniques described herein without departing from the spirit and scope of the invention. Accordingly, although specific embodiments have been described, these are examples only and are not limiting upon the scope of the invention.

The invention claimed is:

1. A device for monitoring a cleaning process of a milk tank, the device comprising:
    a monitoring unit comprising an input device for inputting into the monitoring unit a selected number of stages for the cleaning process of the milk tank;
    a computer and a memory for at least temporarily storing data;
    a first meter for measuring a temperature of a fluid present in the milk tank and for supplying to the monitoring unit a temperature signal indicative of the measured temperature;
    a second meter for measuring an electrical parameter of the fluid present in the milk tank and for supplying to the monitoring unit a parameter signal that is indicative of the measured electrical parameter; and
    a cleaning system controlled by the computer and responsive to the temperature signal or the parameter signal to perform the selected stages.

2. The device as claimed in claim 1, wherein the memory contains per stage a lower threshold or an upper threshold for the temperature or the electrical parameter or a duration of a stage.

3. The device as claimed in claim 2, wherein the monitoring unit further comprises a comparing device for comparing the measured temperature or the measured electrical parameter or a measured time with the relevant threshold.

4. The device as claimed in claim 3, wherein the comparing device auto-selects one of the thresholds with which the measured temperature or the measured electrical parameter or the measured time is compared.

5. The device as claimed in claim 4, wherein the comparing device autoselects a new threshold when the measured electrical parameter has been below a predetermined switch value during a predetermined minimum switch time.

6. The device as claimed in claim 3, wherein the comparing device auto-selects a new threshold on the basis of the measured electrical parameter and the measured temperature.

7. The device as claimed in claim 3, wherein the device further comprises an alarm device operable by the comparing device.

8. An assembly of a milking robot comprising an automatic starting-up unit and a device as claimed in claim 7, wherein the alarm device is connected to the automatic starting-up unit for preventing automatic starting up of the milking robot with the aid of data from the comparing device.

9. The assembly as claimed in claim 8, wherein the second meter is a conductivity meter for measuring the conductivity of the fluid present in the milk tank.

10. The device as claimed in claim 3, wherein the second meter is a conductivity meter for measuring conductivity of the fluid present in the milk tank.

11. The device as claimed in claim 1, wherein the monitoring unit further comprises an input device for inputting into the computer data indicating the type of fluid present in the milk tank.

12. The device as claimed in claim 1, wherein the milk tank comprises a stirring element for stirring a liquid present in the milk tank, the device further comprising a functioning sensor for measuring the functioning of the stirring element and for supplying to the monitoring unit a functioning signal that is indicative of the functioning of the stirring element.

13. The device as claimed in claim 1, wherein the milk tank is provided with a supply line for milk and cleaning fluid, the supply line being provided with a valve, the device further comprising a valve position detector for detecting a valve position of the valve and for supplying to the monitoring unit a valve position signal that is indicative of the valve position of the valve.

14. The device as claimed in claim 13, wherein the supply line is provided with a three-way valve connected to a discharge line to a sewer, the valve being located between the three-way valve and the milk tank, the device further comprising a three-way valve position detector for detecting the valve position of the three-way valve and for supplying to the monitoring unit a three-way valve position signal that is indicative of the valve position of the three-way valve.

15. The device as claimed in claim 14, wherein the device further comprises a third meter for measuring temperature of a fluid present in the discharge line, and for supplying to the monitoring unit a further temperature signal that is indicative of the temperature of the fluid present in the discharge line.

16. The device as claimed in claim 15, wherein the memory contains a lower threshold or an upper threshold for the temperature of a fluid in the discharge line.

17. The device as claimed in claim 13, wherein the device further comprises a meter for measuring an optical parameter of milk or cleaning fluid present in the supply line.

18. The device as claimed in claim 1, wherein the device further comprises a color meter for measuring the color or the intensity of a color band of a fluid present in the milk tank.

19. The device as claimed in claim 1, wherein the second meter is a conductivity meter for measuring conductivity of the fluid present in the milk tank.

20. A method of monitoring a cleaning process of a milk tank, using a monitoring unit comprising an input device, a computer and a memory for at least temporarily storing data, a first meter and a second meter, the method comprising:
inputting into the monitoring unit a number of stages for the cleaning process of the milk tank;
measuring, using a first meter, a temperature of a fluid present in the milk tank and supplying to the monitoring unit a temperature signal indicative of the measured temperature; and
measuring, using a second meter, an electrical parameter of the fluid present in the milk tank and supplying to the monitoring unit a parameter signal that is indicative of the measured electrical parameter; and
controlling the cleaning process to perform the selected stages responsive to the temperature signal or the parameter signal.

21. The method as claimed in claim 20, wherein the memory contains per stage a lower threshold or an upper threshold for the temperature or the electrical parameter or a duration of a stage.

22. The method as claimed in claim 21, wherein the monitoring unit further comprises a comparing device and the method comprises comparing the measured temperature or the measured electrical parameter or a measured time with the relevant threshold.

23. The method as claimed in claim 22, further comprising auto-selecting one of the thresholds with which the measured temperature or the measured electrical parameter or the measured time is compared.

24. The method as claimed in claim 23 further comprising auto-selecting a new threshold when the measured electrical parameter has been below a predetermined switch value during a predetermined minimum switch time.

25. The method as claimed in claim 22, further comprising auto-selecting a new threshold on the basis of the measured electrical parameter and the measured temperature.

26. The method as claimed in claim 22, wherein the method further comprises operating an alarm device in response to the comparing device.

27. The method as claimed in claim 26, wherein the milk tank and monitoring unit form part of a milking robot comprising an automatic starting-up unit, wherein the alarm device is connected to the automatic starting-up unit, and wherein the method further comprises preventing automatic starting up of the milking robot with the aid of data from the comparing device.

28. The method as claimed in claim 27, wherein the second meter is a conductivity meter and the method comprises measuring the conductivity of the fluid present in the milk tank.

29. The method as claimed in claim 22, wherein the second meter is a conductivity meter and the method comprises measuring conductivity of the fluid present in the milk tank.

30. The method as claimed in claim 20, further comprising inputting into the computer, data indicating the type of fluid present in the milk tank.

31. The method as claimed in claim 20, wherein the milk tank comprises a stirring element for stirring a liquid present in the milk tank, the method further comprising measuring the functioning of the stirring element and supplying to the monitoring unit a functioning signal that is indicative of the functioning of the stirring element.

32. The method as claimed in claim 20, wherein the milk tank is provided with a supply line for milk and cleaning fluid, the supply line being provided with a valve, the method further comprising detecting a valve position of the valve and supplying to the monitoring unit a valve position signal that is indicative of the valve position of the valve.

33. The method as claimed in claim 32, wherein the supply line is provided with a three-way valve connected to a discharge line, the valve being located between the three-way valve and the milk tank, the method further comprising detecting the valve position of the three-way valve and supplying to the monitoring unit a three-way valve position signal that is indicative of the valve position of the three-way valve.

34. The method as claimed in claim 33, wherein the method further comprises measuring temperature of a fluid present in the discharge line and supplying to the monitoring unit a further temperature signal that is indicative of the temperature of the fluid present in the discharge line.

35. The method as claimed in claim 34, wherein the memory contains a lower threshold or an upper threshold for the temperature of a fluid in the discharge line.

36. The method as claimed in claim 32, wherein the method further comprises measuring an optical parameter of milk or cleaning fluid present in the supply line.

37. The method as claimed in claim 20, wherein the method further comprises measuring the color or the intensity of a color band of a fluid present in the milk tank.

38. The method as claimed in claim 20, wherein the second meter is a conductivity meter and the method comprises measuring conductivity of the fluid present in the milk tank.

* * * * *